UNITED STATES PATENT OFFICE.

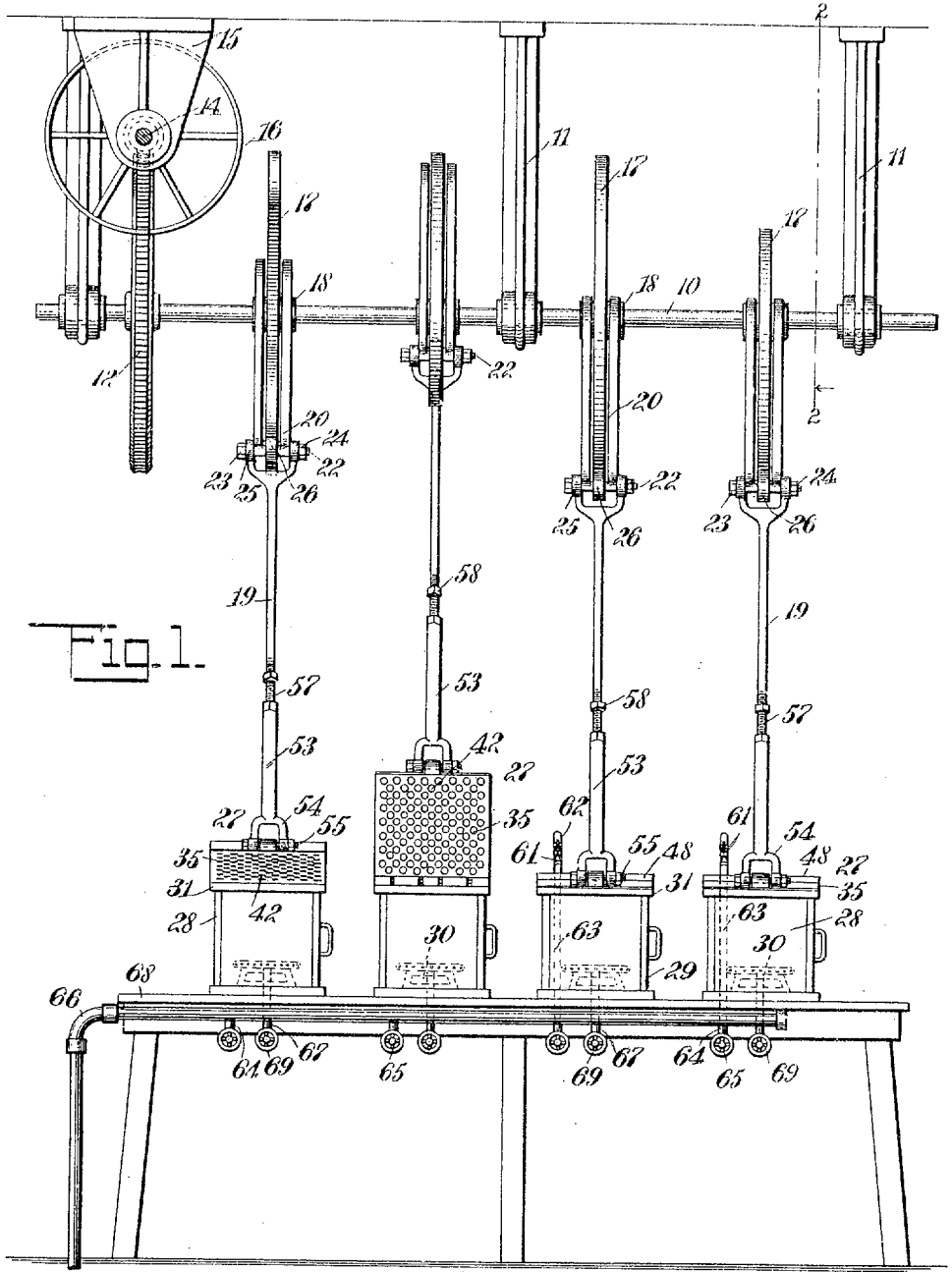

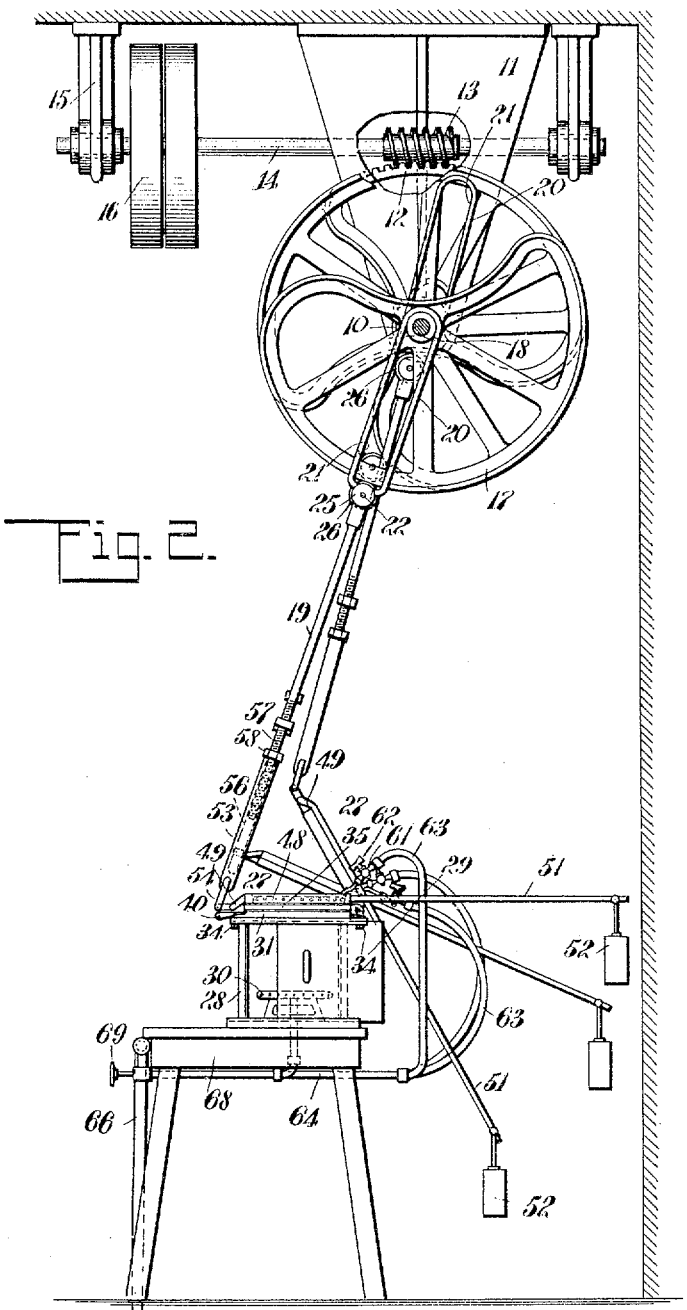

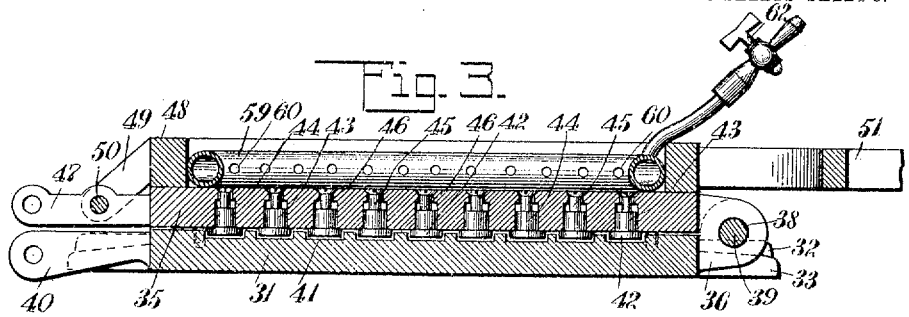
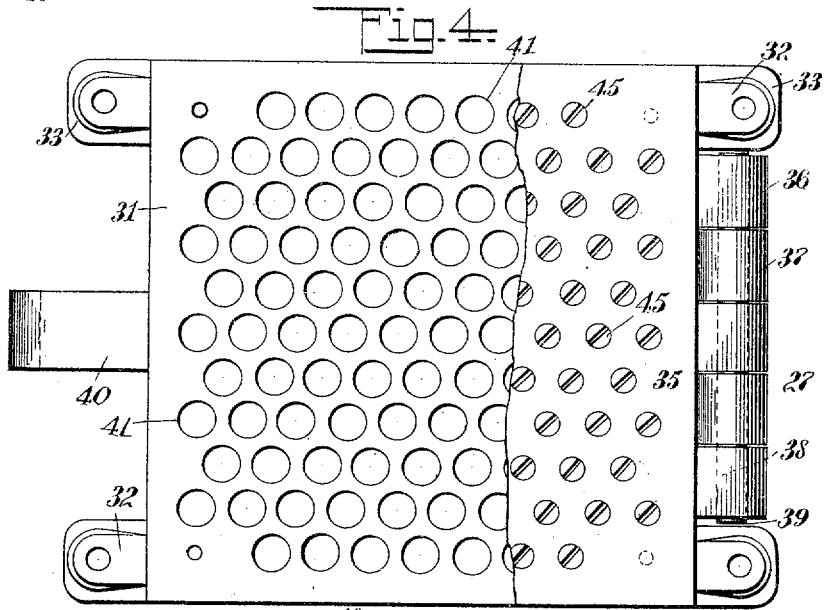
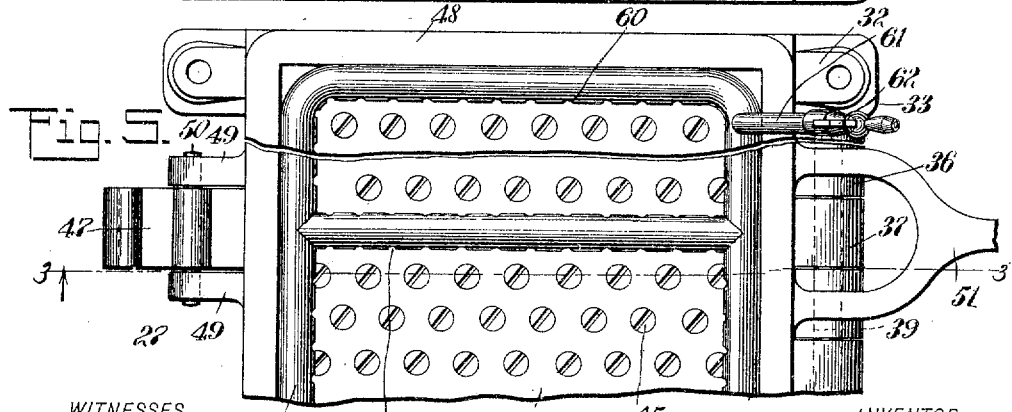

JOSÉ MARTI RIBÉ, OF BARCELONA, SPAIN.

WAFER-MACHINE.

973,304.  Specification of Letters Patent.  Patented Oct. 18, 1910.

Application filed October 30, 1909. Serial No. 525,454.

*To all whom it may concern:*

Be it known that I, JOSÉ MARTI RIBÉ, a subject of the King of Spain, and a resident of Barcelona, Spain, have invented a new and Improved Wafer-Machine, of which the following is a full, clear, and exact description.

The invention relates to machines used in the manufacture of wafers adapted to serve as edible receptacles for powdered drugs and the like, and relates more particularly to a machine of this class in which a plurality of molds is provided, each consisting of a stationary mold member and a movable mold member between which the wafers are formed, the machine including means for intermittently operating the movable mold members, and having burners for applying heat at the molds.

The object of the invention is to provide a simple and efficient machine for use in the molding and baking of edible wafers adapted to contain drugs, etc., the output of which is large, which is simple in operation, and which requires but a single operator.

The invention consists in the construction and combination of parts to be more fully described hereinafter and particularly set forth in the claims.

Reference is to be had to the accompanying drawings forming a part of this specification, in which similar characters of reference indicate corresponding parts in all the views.

Figure 1 is a front elevation of a wafer machine constituting an embodiment of my invention; Fig. 2 is a transverse section on the line 2—2 of Fig. 1, showing the parts of the machine in side elevation; Fig. 3 is an enlarged longitudinal section of one of the molds on the line 3—3 of Fig. 5; Fig. 4 is a plan view of one of the molds, showing one of the members partly broken away and having a burner removed; and Fig. 5 is a plan view of one of the mold members having parts broken away.

Before proceeding to a more detailed explanation of my invention it should be clearly understood that while the machine is particularly useful for the manufacture of wafers used as containers for powdered drugs or other chemicals and necessary in the practice of medicine, it can also be advantageously employed for the forming and baking of wafers for other purposes. I have found it expedient to employ a number of molds in each machine, and this number is preferably four, as I have found that a single operator can conveniently control a machine having this number of molds; however, if so desired the number can be varied in accordance with individual preference and special conditions. I do not limit myself to these or other details of construction, as they can be altered without departing from the underlying spirit of the invention.

Referring more particularly to the drawings I employ a shaft 10 rotatably mounted in any suitable manner, for example, by means of bearing hangers 11. The shaft 10 is actuated from a suitable source of power; for instance, as shown in the illustration, it may be provided with a gear-wheel 12 in mesh with a worm 13 rigid with a transverse shaft 14 journaled in bearings 15 and provided with belt pulleys 16 to permit its operative connection with a prime mover or other source of power. Rigidly secured upon the shaft 10 are a plurality of cam-wheels 17, each having a hub 18 extended in the direction of the length of the shaft 10. The cam-wheels preferably comprise semi-circular lobes having curved reëntrant parts.

I employ connecting-rods 19, each having a bifurcated upper end 20, the sides of which are provided with slots 21 movably engaging the laterally-extended hub 18. Each of the cam-wheels it will be understood is positioned between the sides of the bifurcated part of one of the connecting-rods 19. Each connecting-rod at the beginning of its bifurcated part has a transverse pivot-bolt 22 provided at one end with a head 23 and held in place by a nut 24. The pivot-bolt is carried by extended parts 25 of the sides 20 and has mounted thereon a roller 26 in engagement with the periphery of the corresponding cam-wheel. It will be understood that the slotted sides 20 act as guides for the connecting-rods which are actuated by the cam-wheels.

The mold members 27 are mounted upon casings 28 of substantially rectangular form and each provided with sliding doors 29 to permit the operator to control the burners 30 located within the casing. The casings are mounted upon a suitable table or support 68 which may be of any form adapted for the purpose. Each of the mold members has a lower mold plate 31 secured upon its casing by means of lugs 32 which seat upon lugs 33 of the casing and are fastened thereto by means of suitable bolts 34, or the like. Upon each of the plates 31 is arranged an upper or movable mold plate 35. The plates 31 and 35 have extensions 36 and 37 respectively, arranged in alternation and having registering openings 38 therethrough adapted to receive a common hinge-pin or rod 39 so that the members can be movably connected. The plate 31 has an arm 40 which can be used in the manipulation of the plate when it is mounted in position upon its casing or removed therefrom.

The plate 31, in the upper face thereof, has a plurality of forming or die recesses 41, each of which receives a corresponding die 42 of the upper plate 35. Each of these dies has a body 43 adjustably mounted in a recess 44. The body has in turn a screw-adjusting stem 45 extending through an opening 46 of the plate 35 to the top thereof to permit the projection of the die to be altered as desired. In this way the thickness of the wafers formed by the mold member can be controlled by the operator.

The plate 35 has rigid therewith an arm 47, to which is pivotally connected a frame 48 by means of ears 49 which are secured at opposite sides of the arm 47 by means of a pivot-pin 50. Rigid with the frame is a rearwardly-extending arm 51 which carries at the free end a hinged weight or counterpoise 52 which tends to maintain the mold in a normal position. At the end of each arm 47 is pivotally mounted a socket 53 having a forked end 54, between the sides of which is located the arm 47 and to which it is secured by means of a pivot-pin or bolt 55. Each of the sockets 53 has a longitudinally-threaded recess 56 which receives a correspondingly-threaded end 57 of one of the connecting-rods 19. The connecting-rod also has lock-nuts 58. It will be seen that the effective lengths of the connecting-rods with respect to the mold members can be varied by suitable adjustment of the sockets with respect to the connecting-rods proper.

Within each of the frames 48 is located a burner 59, consisting of hollow members or pipes substantially rectangular in arrangement and having cross pipes. The pipes are provided with outlet openings 60 through which the gas escapes and at which the flames burn. The burners have inlets 61 provided with controlling cocks 62 and connected by means of suitable flexible tubes 63 with the supply pipes 64, the latter having controlling valves 65 and join the main gas conduit 66. Supply pipes 67 are also provided for conducting the gas from the main conduit 66 to the burners 30 within the casings. The conduits 67 have controlling valves 69, and the burners 30 which they supply may be of any suitable type. While I have shown the present form of the machine provided with gas burners, any other heating means which lends itself to the purpose can of course be employed.

It will be seen that as the shaft 10 rotates, the cam-wheels which are mounted thereon successively raise and lower the movable mold members. The cam-wheels are so positioned upon the shafts that the operation of the molds is a successive one and permits a single operator to place the wafer material between the molds and to remove the finished wafers. The weights 52 tend to maintain the movable mold members in lowered positions upon the fixed mold members, and the movable mold members are operated against the gravitational action of the weights.

Having thus described my invention, I claim as new and desire to secure by Letters Patent:

1. In a machine of the class described, a stationary mold plate, a movable mold plate hinged thereto, a connecting-rod hinged to said movable mold plate, a frame hinged to said movable mold plate and having an arm, a counterweight carried by said arm, means for reciprocating said connecting-rod, and a burner arranged within said frame upon said movable mold plate.

2. In a machine of the class described, a stationary mold plate, a movable mold plate hinged thereto, a connecting-rod hinged to said movable mold plate, a frame hinged to said movable mold plate and having an arm, a counterweight carried by said arm, means for reciprocating said connecting rod, a burner arranged within said frame upon said movable mold plate, said stationary mold plate having recesses, said movable mold plate having a plurality of adjustable dies, each adapted to coöperate with one of said recesses to form a wafer, and a burner under said stationary mold plate.

3. In a machine of the class described, a mold having a movable member, a connecting-rod controlling said member, a cam, and means for driving said cam, said connecting-rod having a bifurcated end receiving between the sides thereof, said cam, the sides of said bifurcated end of said connecting-rod being slotted, said cam having a hub guidingly engaging said slotted sides, said connecting-rod having a roller in peripheral engagement with said cam.

4. In a machine of the class described, a mold having a stationary mold plate, a second mold plate pivoted thereto, a frame pivoted to said second mold plate and normally in position thereon, and a burner arranged within said frame and comprising hollow members having flame outlets, and having a flexible connection for the introduction of gaseous or other fuel.

In testimony whereof I have signed my name to this specification in the presence of two subscribing witnesses.

JOSÉ MARTI RIBÉ.

Witnesses:
RAMON MARTI BELLA,
HENRY MARTINE.